(12) United States Patent
Carruthers et al.

(10) Patent No.: US 11,436,844 B2
(45) Date of Patent: Sep. 6, 2022

(54) IN-VEHICLE MONITORING SYSTEM AND DEVICES

(71) Applicant: KLASHWERKS INC., Ottawa (CA)

(72) Inventors: Dan Carruthers, Ottawa (CA); Christian Molson, Ottawa (CA); Dan Crawford, Ottawa (CA); David Kennedy, Ottawa (CA); Robert Watson, Frankville (CA); Russell Ure, Ottawa (CA); Shing Ho, Ottawa (CA); Jeff Washer, Ottawa (CA)

(73) Assignee: KLASHWERKS INC., Ottawa (CA)

( * ) Notice: Subject to any disclaimer, the term of this patent is extended or adjusted under 35 U.S.C. 154(b) by 314 days.

(21) Appl. No.: 16/608,718

(22) PCT Filed: Apr. 30, 2018

(86) PCT No.: PCT/CA2018/050506
§ 371 (c)(1),
(2) Date: Oct. 25, 2019

(87) PCT Pub. No.: WO2018/195671
PCT Pub. Date: Nov. 1, 2018

(65) Prior Publication Data
US 2021/0097315 A1    Apr. 1, 2021

Related U.S. Application Data

(60) Provisional application No. 62/491,638, filed on Apr. 28, 2017.

(51) Int. Cl.
*G06K 9/00* (2022.01)
*G06V 20/59* (2022.01)
*H04W 4/80* (2018.01)
*H04W 4/40* (2018.01)
*G06F 3/01* (2006.01)
*G06F 3/16* (2006.01)
(Continued)

(52) U.S. Cl.
CPC ............... *G06V 20/59* (2022.01); *G06F 3/017* (2013.01); *G06F 3/167* (2013.01); *G06V 40/107* (2022.01); *G06V 40/28* (2022.01); *G07C 5/008* (2013.01); *G07C 5/0825* (2013.01); *G07C 5/0866* (2013.01); *H04L 65/4069* (2013.01); *H04W 4/40* (2018.02); *H04W 4/80* (2018.02)

(58) Field of Classification Search
CPC .......... G06K 9/00832; G06K 9/00355; G06K 9/00375; G06K 9/00; G06F 3/017; G06F 3/167; G06F 3/01; G06F 3/16; G04L 65/4069; H04W 4/40; H04W 4/80; H04W 4/48; H04L 65/4069; H04L 29/06; G07C 5/0825; G07C 5/008; G07C 5/0866; G07C 5/08; G07C 5/00; G06V 20/59; G06V 40/28; G06V 40/107
See application file for complete search history.

(56) References Cited

U.S. PATENT DOCUMENTS

| | | | |
|---|---|---|---|
| 2008/0065291 A1* | 3/2008 | Breed | G06K 9/00355 701/36 |
| 2014/0277915 A1* | 9/2014 | Bertosa | G06Q 30/0613 701/31.4 |

\* cited by examiner

*Primary Examiner* — Tuan H Nguyen
(74) *Attorney, Agent, or Firm* — Sheppard, Mullin, Richter & Hampton LLP

(57) ABSTRACT

An in-vehicle monitoring device includes both forward facing and rear facing cameras. The in-vehicle monitoring device can detect occurrence of one or more triggering events and flag portions of captured videos. The flagged video portions may be transferred to other devices.

18 Claims, 9 Drawing Sheets

(51) Int. Cl.
*G07C 5/00* (2006.01)
*G07C 5/08* (2006.01)
*H04L 65/61* (2022.01)
*G06V 40/20* (2022.01)
*G06V 40/10* (2022.01)

IN-VEHICLE MONITORING SYSTEM AND DEVICES

RELATED APPLICATION

The current application claims priority under the Paris convention to U.S. Provisional Application 64/491,638, filed Apr. 28, 2017, and titled "In-Vehicle Monitoring System and Devices." in its entirety for all purposes.

TECHNICAL FIELD

The current disclosure relates to vehicle monitoring, and in particular to in-vehicle monitoring devices and systems.

BACKGROUND

Existing in-vehicle monitoring devices typically comprise one or more cameras that capture audio/video of the vehicle or its environment. For example, an in-vehicle monitoring device, which may be commonly referred to as a 'dashcam', may capture a forward-facing view from a dash or interior view of the vehicle. Further in-vehicle monitoring devices may include devices without cameras that log telematics and/or other vehicle data. In-vehicle monitoring devices may store the captured data on a removable memory card, such as an SD or microSD memory card, that allows the captured audio/video data to be physically transferred to other computing devices. Additionally or alternatively, in-vehicle monitoring devices may use other techniques for connecting the in-vehicle monitoring device to a computing device in order to transfer the captured audio/video data.

While current in-vehicle monitoring devices capture audio/video data, it would be desirable to have an additional, alternative and/or improved in-vehicle monitoring device.

BRIEF DESCRIPTION OF THE DRAWINGS

For a more complete understanding of this disclosure, reference is now made to the following brief description, taken in connection with the accompanying drawings and detailed description.

DETAILED DESCRIPTION

Figure 1:
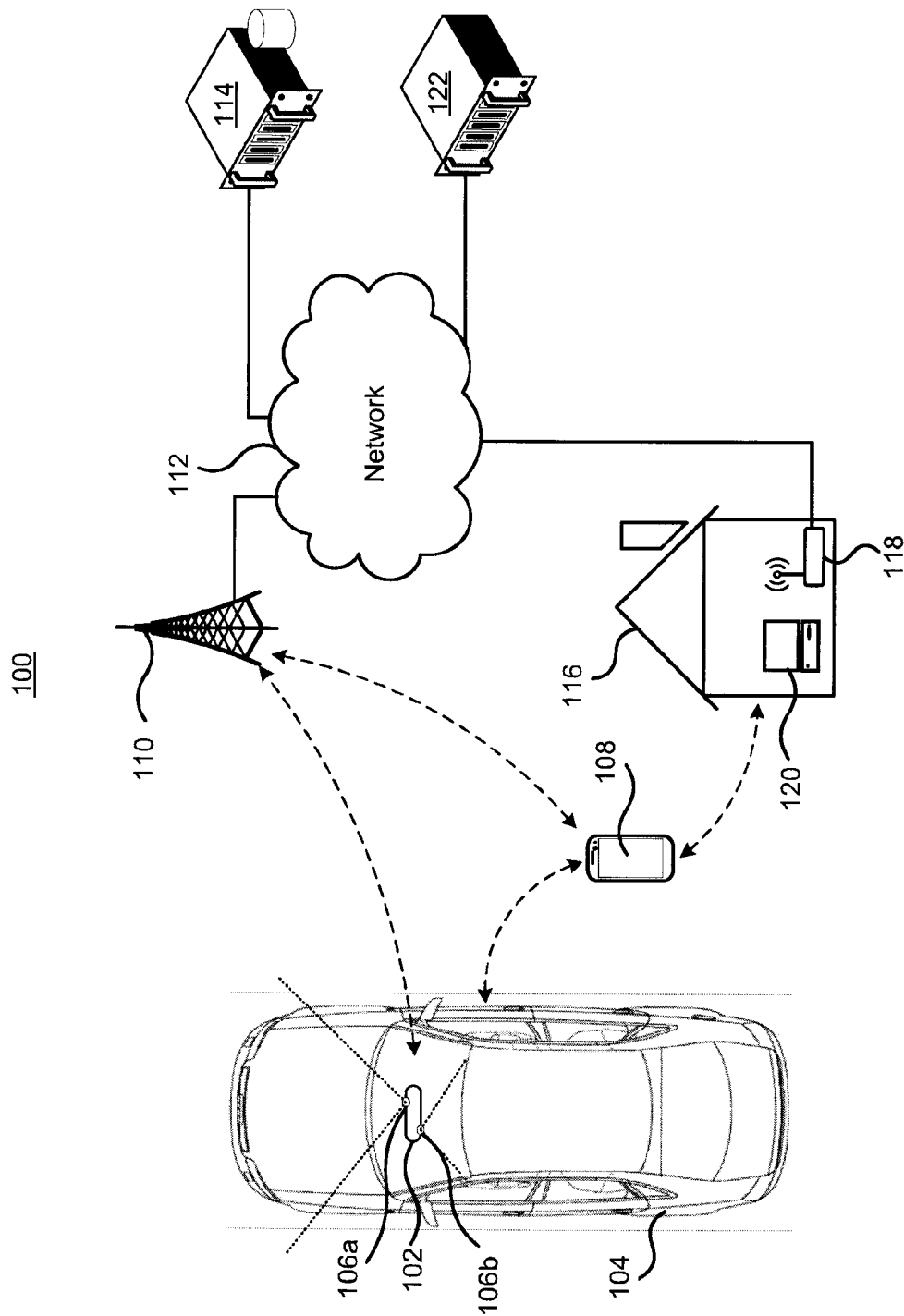
FIG. 1 depicts an in-vehicle monitoring device and system.

In accordance with the present disclosure there is provided an in-vehicle monitoring device for use within a cabin of a vehicle comprising: a front camera arranged to capture an exterior view from the cabin of the vehicle; a rear camera arranged to capture an interior view of the cabin of the vehicle; a display capable of displaying information to an occupant of the vehicle; a memory for storing data and instructions; a processor operably coupled to the front camera, rear camera, display, and the memory, the processor capable of executing the instructions stored in the memory, which when executed configure the in-vehicle monitoring device to: detect a triggering event performed within the cabin of the vehicle; and based upon detection of the triggering event, storing one or more of: at least a portion of exterior image data captured from the front camera; and at least a portion of interior image data captured from the rear camera.

In a further embodiment of the in-vehicle monitoring device, detecting the triggering event comprises detecting a gesture.

In a further embodiment, the in-vehicle monitoring device further comprises a proximity detector arranged to detect proximity of an object within the cabin of the vehicle, wherein detecting the gesture comprises: detecting as the gesture an object within a proximity range of the proximity detector.

In a further embodiment of the in-vehicle monitoring device, detecting the gesture comprises processing interior image data captured from the rear camera to detect at least one feature in the interior image data as the gesture.

In a further embodiment, the in-vehicle monitoring device further comprises a proximity detector arranged to detect proximity of an object within the cabin of the vehicle, wherein detecting the gesture comprises: detecting an object within a proximity range of the proximity detector; and upon detecting the object within the proximity range, processing the interior image data to detect the at least one feature in the interior image data as the gesture.

In a further embodiment of the in-vehicle monitoring device, the at least one detected feature comprises a plurality of features detected in one or more frames of the interior image data, the plurality of features used in determining performance of the gesture from a plurality of known gestures.

In a further embodiment, the in-vehicle monitoring device further comprises a microphone, wherein detecting the triggering event comprises detecting one or more known utterances from microphone data, the one or more known utterances each associated with a respective action of a plurality of possible actions including storing at least the portion of the interior image data or the portion of exterior image data.

In a further embodiment, the in-vehicle monitoring device further comprises a power component configured to provide electrical power to components of the in-vehicle monitoring device, the power component electrically connected to: an internal rechargeable battery; and an external power connection.

In a further embodiment of the in-vehicle monitoring device, the instructions, when executed by the processor, further configure the in-vehicle monitoring device to: detect a disconnection of the port connector; switch to the internal rechargeable battery; and perform an anti-tampering action.

In a further embodiment, the in-vehicle monitoring device further comprises: a short range communication radio; and a cellular communication radio.

The in-vehicle monitoring system of claim 10, wherein the in-vehicle monitoring device is configured to transfer data to a mobile device over a communication channel established using a short range communication radio.

In a further embodiment of the in-vehicle monitoring device, the instructions, when executed by the processor, further configure the in-vehicle monitoring device to: receive a streaming request from a remote device; and streaming to the remote device video from the front camera or from the rear camera.

In accordance with the present disclosure there is further provided a method of monitoring a vehicle using an in-vehicle monitoring device, comprising: recording, to a memory of the in-vehicle monitoring device, video captured from one or more of: a forward camera of the in-vehicle monitoring device arranged to capture an exterior view from a cabin of the vehicle; a rear camera of the in-vehicle monitoring device arranged to capture an interior view of the cabin of the vehicle; determining that a trigger event has occurred; flagging a portion of the recorded video in the memory of the in-vehicle monitoring device; and transferring the flagged video portion from the in-vehicle monitoring device to a second device through a wireless network connection.

In a further embodiment of the method, recording video comprises recording the video in separate video files each of a predetermined length of time.

In a further embodiment of the method, the trigger event comprises one or more of: occurrence of a gesture; occurrence of a voice command; detection of sensor values outside of set conditions; detection of an operating parameter outside of set conditions; and reception of an external trigger.

In a further embodiment, the method further comprises detecting occurrence of the gesture, wherein detecting the gesture comprises detecting by a proximity detector of the in-vehicle monitoring device an object within a proximity detecting range.

In a further embodiment, the method further comprises detecting occurrence of the gesture, wherein detecting the gesture comprises processing the interior image data captured from the rear camera to detect at least one feature in the interior image data as the gesture.

In a further embodiment, the method further comprises detecting occurrence of the gesture, wherein detecting the gesture comprises: detecting by a proximity detector an object within a proximity detecting range; and upon detecting proximity of the object, processing the interior image data captured from the rear camera arranged to detect at least one feature in the interior image data as the gesture.

In a further embodiment of the method, transferring the flagged video portions from the in-vehicle monitoring device to the second device comprises: determining if there is an immediate transfer condition; and if the immediate transfer condition is determined, transferring the flagged video portions to the second device using any available wireless communication channel.

In a further embodiment of the method, transferring the flagged video portions from the in-vehicle monitoring device to the second device comprises: detecting at the in-vehicle monitoring device a local wireless connection to a mobile device; transferring the flagged video portions from the in-vehicle monitoring device to the mobile device over the local wireless connection; and transferring the flagged video portions from the mobile device to a second device.

In accordance with an aspect of the present disclosure there is provided an in-vehicle monitoring system for use within a cabin of a vehicle comprising: a front camera capable of capturing an exterior view from the cabin of the vehicle; a rear camera capable of capturing an interior view of the cabin of the vehicle; a display capable of displaying information to an occupant of the vehicle; a short range communication radio; a cellular communication radio; a power component configured to provide electrical power to components of the in-vehicle monitoring device, the power component electrically connected to: an internal battery connector; and an external power source connector; a memory for storing data and instructions; a processor operably coupled to the front camera, rear camera, display, short range communication radio, cellular communication radio, power component, and the memory, the processor capable of executing the instructions stored in the memory, which when executed configure the in-vehicle monitoring device to: receive interior image data from the rear camera; process the interior image data to detect at least one feature in the interior image data; and based upon detection of the at least one feature, storing at least a portion of the interior image data or a portion of exterior image data from the front camera in association with event data associated with the detected at least one feature.

An in-vehicle monitoring device may be mounted within a passenger cabin of a vehicle, such as on the dash of the vehicle, the windshield of the vehicle or the rear view mirror of the vehicle. As described further below, the in-vehicle monitoring device comprises at least a front camera that captures a forward-facing, or exterior, view when the monitoring device is properly mounted within the vehicle. In addition to the front camera, the in-vehicle monitoring device also comprises a rear camera that captures a cabin-facing view when the monitoring device is properly mounted within the vehicle. The in-vehicle device may include additional components or sensors for collecting vehicle information, such as speed, location, direction, etc. The in-vehicle monitoring device also includes a processor for processing image data captured from one or more of the cameras as well as providing other functionality.

Image data from the cabin-facing view of the rear camera is processed to identify one or more features within the image data. The detection of the features may be used as gestures or triggering events for performing certain actions. For example, when specific features, such as those associated with a particular gesture, are detected, the in-vehicle monitoring device may store a short portion of video, or flag a portion within a larger video, from the forward camera, the rear camera or both. The in-vehicle monitoring device may include various communication radios for transferring captured videos, or portions of the videos, and/or vehicle telematics data, to other computing devices such as network based servers, a user's phone, laptop or computer. The transferring of the data may be accomplished over a cellular radio, allowing for example the video data to be transferred to a network based storage location. Additionally or alternatively, the transferring of the video and/or telematics data may be accomplished over a relatively short-range radio such as a Wi-Fi™, Bluetooth™, Bluetooth Low Energy (BLE)™ radios allowing the data to be transferred to other devices such as a user's mobile device. The mobile device, which may be for example a user's cell phone, may act as a "data mule" allowing the video and telematics data to be easily transferred from the in-vehicle monitoring device to other computing devices by first transferring the data to the mobile device using the short-range radio then having the mobile device transfer the data to the cloud, or other computing devices, once the mobile device is within range of a recognized Wi-Fi zone or using the mobile device's cellular connection. The mobile device may allow the telematics data, short captured videos or flagged portions of videos to be easily shared across multiple network locations including social networking sites. Further, the in-vehicle monitoring device may provide other functionality such as detection and notification of break-ins or vandalism, towing detection and notification as well as tampering attempts such as powering off the device or disconnecting the device from a power source. Further, the in-vehicle monitoring device may allow remote notifications based on vehicle operating parameters or sensor values. Further the in-vehicle monitoring device may provide remote monitoring of vehicle information and/or streaming of audio and/or video from the in-vehicle monitoring device to remote devices such as a mobile phone or tablet.

FIG. 1 depicts an in-vehicle monitoring device and system. The system 100 comprises an in-vehicle monitoring device 102 that can be mounted within a vehicle 104. The in-vehicle monitoring device 102 comprises a front camera 106a and a rear camera 106b. The front camera 106a faces forward when properly installed in the vehicle and captures an exterior view of the vehicle. The rear camera 106b captures an interior view of the vehicle's cabin. As described further below with reference to FIG. 2, the in-vehicle monitoring device 102 may be connected to the vehicle's power supply as well as including a battery source. The connection to the vehicle's power supply may be provided directly to the vehicle's battery or may be connected to a switched power supply controlled by, for example, a 12 VDC port controlled by the vehicle's ignition system. Connecting the device 102 directly to the battery may allow the device to operate even if the vehicle is not running while connecting the device 102 to the switched power supply may ensure that the device 102 is only operational while the vehicle is running to ensure that the in-vehicle monitoring device does not deplete the vehicles battery. Additionally, the connection of the power supply may be done through an on-board diagnostic (OBD) OBD-II port providing Controller Area Network (CAN bus) communications, or similar on-board port connection, which in addition to providing an electrical connection to the vehicle's ECU or computer provides a power connection allowing the in-vehicle device to be powered even when the vehicle is not running. However, when the in-vehicle monitoring device 102 determines that the vehicle is off, for example by monitoring the OBD CAN bus and voltage/current levels on the power connection to determine the state of the vehicle, the device 102 may enter a low-power mode when the vehicle is not running in order to prevent unnecessarily draining the vehicle's battery or when a voltage/current level drops below a pre-defined threshold.

The in-vehicle monitoring device 102 may capture and process the image data from the cameras to perform various actions. For example, the device 102 may maintain a rolling window of video shorts from the different cameras. That is, a plurality of short videos, such as for example 30 seconds to 5 minutes in length may be stored, and when storage on the device reaches a particular level, new short videos may overwrite previously stored short videos starting with the oldest. The monitoring device 102 may further include image processing functionality for processing the image data received from the one or more of the cameras in order to identify features within the image data. For example, the image from the rear camera may be processed in order to detect gestures performed by a vehicle occupant, and trigger an action associated with the detected gesture. The triggered action may depend upon the detected gesture and may include for example, capturing a picture from the front and/or rear camera, capturing a short video from the front and/or rear camera, and/or flagging a portion of a video or short video captured from the front and/or rear camera for permanent storage or for transferring to another device. Short videos that have been flagged may not be overwritten by new video shorts when storing the rolling window of videos. The flagged videos may be copied to another memory location to prevent overwriting of flagged videos.

The system 100 may further include a user's mobile device 108. The mobile device 108 may include an application, or other functionality, for connecting to the in-vehicle device 102 when the user is in the vehicle, or at least in close proximity to the vehicle, using a short range communication radio, such as a Wi-Fi radio and/or a Bluetooth radio. When connected, stored data on the in-vehicle device 102 may be transferred to the user's mobile device 108. Additionally, when connected to the user's mobile device 108, it may be possible for the in-vehicle monitoring device 102 to use the mobile device's cellular radio to transmit data over a cellular infrastructure 110 and networks 112 to a remote computing device 114. The remote computing device 114 may be an online storage provider, a social network, a website or websites or other remote locations. Additionally or alternatively, the in-vehicle monitoring device 102 may include its own cellular radio for communicating over the cellular infrastructure 110. The in-vehicle monitoring device 102 may use the Bluetooth radio to determine a current driver, from a number of associated drivers. For example, pairing of a mobile device associated with a particular driver may be used to determine which one of the possible drivers is the current driver. If multiple devices are paired or detected by the in-vehicle monitoring device a user may be prompted to identify the current driver. Additionally or alternatively, when multiple possible drivers are detected other means may be used to determine the current driver including for example comparing previously determined driving characteristics, such as braking and acceleration profiles, with current driving characteristics. The braking and acceleration profiles may provide information on how a driver typically brakes (i.e. hard braking or soft braking) as well as how a driver typically accelerations. Further, Bluetooth pairing with a driver's mobile device may be used to disable security features of the in-vehicle monitoring device 102 such as anti-tampering functions, theft notifications, etc. Additional or alternative techniques for identifying a driver may be provided including for example facial recognition techniques using images captured from the rear cabin-facing camera.

In addition to connecting to the in-vehicle monitoring device 102 over a short-range communication radio when the mobile device 108 is within the vehicle, the mobile device 108, or more particularly the app or functionality on the mobile device, may connect to the in-vehicle monitoring device 102 over a cellular connection, or other long-range radio, when away from the vehicle to allow monitoring of the vehicle, including pictures, audio, video, telematics data and other available vehicle data. Two-way communications may be established between the mobile device and the in-vehicle monitoring device in order to allow monitoring and/or communication between users of the mobile device and vehicle occupants.

The mobile device 108 may act as a data mule for the in-vehicle device 102. That is, the mobile device 108 may provide a convenient intermediary for transferring data from the in-vehicle monitoring device 102 to another device. The mobile device 108 may carry data for transfer from the in-vehicle device to a user's home computer or other computing device such as cloud servers. Data from the in-vehicle device 102 may be transferred to the mobile device 108 over a local communication channel such as a Wi-Fi or Bluetooth connection. Once transferred to the mobile device 108, the data may be transferred from the mobile device 108 to another computing device such as a cloud, or network, location or a user's personal computer or laptop. The transfer of data from the mobile device to the other computing device may be performed when the mobile device is connected to a known network, such as a home network in order to avoid or reduce the cost of transferring the data. The mobile device 108 may also share the data, or portions of the data on social media or send to others using various communication means, including text messages, e-mails, etc. Rather than waiting to connect to an available Wi-Fi network, the mobile device 108 may transfer the data over a cellular connection, however it is assumed to be advantageous to transfer data over a Wi-Fi connection due to cost and speed of transfer. For example, audio/video data the mobile device 108 when the user is in the vehicle 104 with their mobile device 108. The user may enter their home 116 which has a wireless connection 118 to the network 112. When the user enters their home 116, the mobile device 108 may connect to the wireless network 118 and the functionality on the mobile device 108 may be configured to automatically transfer the data to the remote computing device 114, such as a cloud based storage location, once the mobile device connects to the home wireless network or designated home or other networks. Additionally or alternatively, the user may transfer data from the mobile device 108 to a home computer 120 for further processing or storage. Additionally or alternatively, the in-vehicle monitoring device 102 may provide Wi-Fi hotspot connectivity to allow mobile devices 102 within the vehicle to connect or access the Internet or functions of the in-vehicle monitoring device 102 provided by a Wi-Fi connection to a home network or a mobile network.

The mobile device 108 may include functionality for remotely connecting the in-vehicle monitoring device 102 either for viewing the camera data, which could be useful for example for a parent wishing to monitor a child's driving. Although described as a parent checking in on a child, other relationships between trusted individuals are possible. Further, the in-vehicle monitoring device 102 may include functionality for generating notifications and transmitting them to the remote mobile device 108, or other specified devices. For example, a notification could be sent to the mobile device 108 if one or more operating parameters or sensor values are exceeded such as speeding, or if some other triggering event occurs such as a theft or towing of the vehicle. Further, in addition to transmitting a notification to the mobile device 108, it may be possible for the notification to be sent to a plurality of specified mobile devices of trusted individuals based on the triggering event of the notification.

In addition to the in-vehicle monitoring device 102 and the mobile device 108 with monitoring functionality, the system 100 may further comprise a web server 122 that provides web based interface for configuring and interacting with the in-vehicle monitoring device 102 and/or the mobile device 108. For example, the web service 122 may provide a service for subscribers to monitor and configure the in-vehicle monitoring device. In addition to providing configuration functionality to the in-vehicle monitoring device 102, the web server 122 may provide a dashboard to users, allowing them to view, edit and share multimedia content captured by the in-vehicle monitoring device 102.

Figure 2:
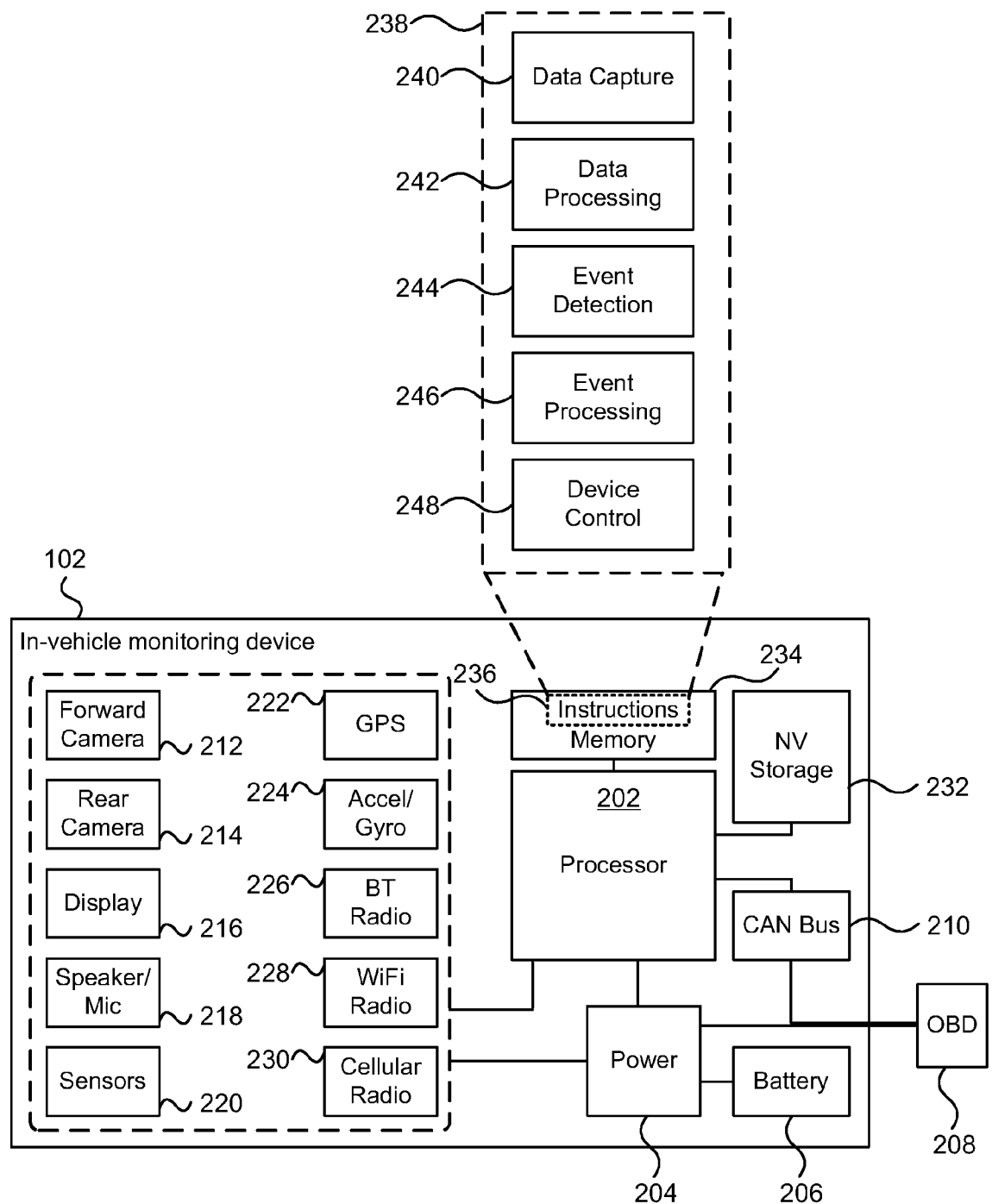
FIG. 2 depicts components of an in-vehicle monitoring device.

FIG. 2 depicts components of an in-vehicle monitoring device. The in-vehicle monitoring device 102 may be used as the in-vehicle monitoring device 102 described above with regard to FIG. 1. The device 102 depicted in FIG. 2 is only one possible implementation of an in-vehicle monitoring device. The device 102 comprises a processing device 202, which may be provided by for example a central processing unit (CPU), programmable controller or microcontroller, an application specific integrated circuit (ASIC) or a field programmable gate array (FPGA) or similar device. The processing device 202 may be connected to a plurality of components including a power component 204 that supplies electrical power to the processing device 202 and other components of the in-vehicle monitoring device. The power component 204 may provide output power based on a wide range of input powers. For example, the power component may operate with input voltages of 12 volts commonly found in passenger vehicles, or 24 volts commonly found in commercial vehicles as well as lower voltages of batteries. The power component 204 may include a battery connection for receiving power from an internal battery 206, which may be a rechargeable battery. Additionally, the power component 204 may include a connection for connecting to the vehicle's power. The connection to the vehicles power is depicted as being provided by an OBD-II port connection 208, although other connections are possible including for example a Deutsch 9-pin connector commonly found in commercial vehicles. The OBD-II port connection 208 can provide both power for the in-vehicle monitoring device as well as access to vehicle information such as speed, braking, etc. The power component 204 may select an appropriate power source depending upon operating conditions. Further, the power component 204 may include monitoring functionality for monitoring a voltage of the vehicle's power supply to ensure that the device 102 does not drain the vehicle's power supply when the vehicle is not running. The device 102 may also monitor the vehicle's battery to reduce functions of the device 102 when the battery of the vehicle is below a certain level to reduce further drain. For example if the vehicle is parked for an extended period of time the in-vehicle device 102 may enter a standby mode to reduce power consumption. In a standby mode, the in-vehicle device 102 may only monitor a subset of sensors or cameras of the device 102 to conserve power. Alternatively the device 102 may utilize the internal battery 206 when the vehicle battery reaches a particular power level threshold. The internal battery 206 may provide extended operation of the in-vehicle monitoring device 102 without depleting the vehicle's battery. The connection to the OBD-II port of the in-vehicle device 102 may be monitored to determine if it is disconnected from OBD-II power of the vehicle. When a disconnection is detected, the in-vehicle device 102 will switch to internal battery power and transmit a notification that it has been unplugged and can send snapshots from the camera and location information.

In addition to the electrical connection to the vehicle's power source, the OBD-II port connector 208 may include data connections to the vehicles communication bus. The OBD-II port's data connections provide the in-vehicle device 102 access to vehicle data and telematics information. The data connections may be provided by an appropriate component for communicating with the vehicle's data bus. The bus communication component is depicted as a CAN bus interface 210 that can send and receive messages over a CAN bus, which are typically implemented within vehicles in order to allow different components, including controllers, sensors, and actuators to communicate with each other.

The in-vehicle monitoring device 102 further comprises a number of components in communication with the processing device 202. As depicted the components include a forward camera 212 and a rear camera 214. Although not depicted, the in-vehicle monitoring device may include one or more infrared (IR) LEDs for lighting the interior of the cabin during nighttime, along with an IR switcher for the cabin facing camera to support night vision. While it is possible to provide exterior facing IR LEDs, they may be difficult to illuminate the exterior scene and as such may be omitted. As described above, the cameras may be arranged in order to capture an external view of the vehicle and an internal view of a cabin of the vehicle. The in-vehicle monitoring device 102 may further comprise one or more display devices capable of displaying information, such as driving direction information, speed, navigation information, etc. The device 102 may further include a speaker and/or microphone 218. Additional sensors 220, such as pressure sensors, environmental sensors, motion sensors, light sensors, noise sensors, humidity sensors, etc. may be included. Further sensors may include a GPS sensor 222 for determining a location of the device 102 and accelerometers and/or gyroscopes 224 for detecting movement and orientation of the device 102. The OBD-II port connector 208 for accessing the vehicle's CAN bus, which may provide access to data from the vehicle's sensors.

The in-vehicle monitoring device 102 may include a plurality of communication radios providing various communication channels. The communication radios may include relatively short range radios, personal area network or local area network radios, such as a Bluetooth radio 226 and a Wi-Fi radio 228. Additionally, the communication radios may include longer range radios or wide area networks radios such as a cellular radio 230. The selection of which communication radio to use may depend upon configuration parameters of the in-vehicle monitoring device 102. For example, if the cellular radio 230 is associated with an unlimited data account, the monitoring device 102 may use the cellular radio to transmit all data. If however, the device is configured with a text message only cellular account, the device 102 may be configured to use the Wi-Fi radio or Bluetooth radio to transfer data to another computing device such as the mobile device.

In addition to the sensors and components described above, the in-vehicle monitoring device 102 may further include non-volatile (NV) storage 232 for the storage of data, including for example captured audio/video and other sensor data. The NV storage 232 may be provided by removable and/or non-removable memory media and may be encrypted. For example, the NV storage 232 may be provided by non-removable memory as well as a removable memory card. Data may be stored to either the removable or non-removable storage. Data, such as captured audio/video, may be copied to both the removable storage and the non-removable storage for redundancy. The in-vehicle monitoring device 102 may provide data logging functionality for vehicle telematics. The logged telematics data may be stored in the non-removable storage to prevent tampering with the data. The data can be downloaded from the in-vehicle monitoring device 102 by physically connecting the in-vehicle monitoring device 102 to a computer, for example by a USB cable. Securing the data against tampering may allow the in-vehicle monitoring device to be used in applications which the integrity of the logged data must be maintained. In order to download the data from the device 102, the in-vehicle device 102 may require confirmation to be provided from a mobile device associated with the in-vehicle monitoring device 102 in order to provide access to the stored data. In addition to the NV storage, the device 102 may further comprises memory 234 for storing data and instructions 236. The instructions 236, when executed by the processing device 202, configure the in-vehicle monitoring device to provide various monitoring functionality 238. The functionality 238 may provide various functionality to the monitoring device 102 such as that described above with reference to the operation of the in-vehicle monitoring device 102 described above.

The in-vehicle monitor's functionality 238 may be provided through various components or modules, which may be configured by the execution of instructions stored in memory by the processing device 202. FIG. 2 depicts the in-vehicle monitor's functionality 238 as being provided by data capture functionality 240, data processing functionality 242, event detection functionality 244, event processing functionality 246 and device control functionality 248. It will be appreciated that the described functionality may be provided in various ways.

The data capture functionality 240 may provide functionality for capturing data from numerous sources, including the forward camera 212 and rear camera 214. The data capturing functionality 240 may control details of how the data is captured, including for example, frame rates, resolutions, encoding and compression. The data capture functionality 240 may also capture data from other sensors such as the GPS component 222 and the accelerometers and gyroscopes 224. The video data may be stored in short video segments, such as for example between 30 seconds to 5 minutes in length, in a rolling window. That is, newer video shorts may overwrite older video shorts, unless the older video short has been flagged for longer storage or transfer. The particular data captured from the various data sources may be stored in association with time information to allow the stored data to be combined together at a later time. For example, video and audio data can be correlated with logged GPS data based on the time the data was captured to determine the location that the particular audio/video was captured. Additionally, or alternatively, sensor data may be combined with the audio/video data as it is captured and stored. For example, GPS information, speed information or other captured data, may be overlaid on the captured video data as it captured and stored. Additionally, the data capture functionality 240 may periodically capture, such as for example between every 1 to 5 seconds, still images from the front camera and/or rear camera to provide a time-lapse video of a trip. The time-lapse may be captured for a particular trip, which may be specified by the user, or may be determined automatically by the in-vehicle monitoring device. The in-vehicle device may determine a single trip to begin with turning on the vehicle and may end with turning off the vehicle. A trip may continue after turning off the vehicle if the vehicle is turned back on within a particular length of time, such as for example 5 minutes to 10 minutes.

The data processing functionality 242 may process data including the data received from the forward camera 212 and the rear camera 214, as well as sensor data and external data. The image data from the rear camera 214 may be processed in order to detect one or more features of gestures within the image data. The one or more features may be used in determining if a gesture has been performed by an occupant of the vehicle. For example, data from the rear camera, which captures a view of the passenger cabin may be processed in order to detect features of an occupant's hand as it makes a 'thumbs up' gesture. Other hand gestures are possible, including a thumbs down, a peace sign, holding up one or more fingers together or spread apart, a closed fist, etc. . . . . The image data may comprise one or more frames captured from the camera and may include movement such as waving.

In addition to processing image data captured by from the rear camera 214, the data processing functionality may also process image data captured from the forward camera 212. The forward camera 212 image data may be processed to provide various features, including for example vehicle and obstacle detection, road sign detection, pedestrian detection. The data processing may also process audio from within the cabin to determine key words or trigger words to start an action or identify an event. The data processing component 244 may also process sensor data, such as accelerometer data, and telematics data received from the vehicle to identify possible events or triggers such as hard braking, acceleration, impacts etc.

The event detection component 244 may receive information from various sources, including for example sensors of the in-vehicle monitoring device 102, the data processing component 242, or external devices such as data from vehicle devices received over the CAN bus. The event detection component 244 may process the received data to determine if an event has occurred. For example, the data processing component 242 may provide detected features to the event detection component 244, which may process the detected features to determines if a gesture event occurred, such as an occupant giving a 'thumbs up' gesture. The event detection may comprise detecting different gestures in the image data. Further, the event detection component 244 may process data from a cabin microphone to detect one or more spoken utterances that can provide voice control. Further, events may be generated from other sensor data. For example, a "speeding" event may be raised if a vehicle speed as determined by one or more sensors exceeds a particular threshold. The threshold may be pre-set, such as a maximum speed, or may be based on other factors such as posted speed limits as possibly determined from processing the image data from the forward camera, weather information, such as expected precipitation and temperature and other possible factors. Other events may include break-in event which may be determined from processing audio/video data. Broken window detection may be aided by enhancing the audio/video detection with air pressure sensor data in order to detect changes in pressure occurring at the same time as a breaking sound. Further events may include a tow event that may be determined based on the accelerometer and gyroscope data, as well as a tampering event which may be determined based on detection that the in-vehicle device has been detached from the vehicle. The power switch of the in-vehicle monitoring device can trigger an event when it's being powered down and takes photos from the cameras of the device. A notification and the photos are then sent to the owner to notify them of a possible tampering event. The above examples of events is not exhaustive and a wide range of other events may be determined.

There may be a number of different classes of possible events. For example, an event may be triggered when some sensor value exceeds a threshold. For example, a speeding event occurs when the speed exceeds a threshold, a hard braking event when a braking G-force exceeds a threshold, and a tampering event occurs when the device is disconnected from the power system of the vehicle such as by disconnecting from the OBD-II port connector. Other event types may be user-generated for example by detecting the user performing a hand or voice gesture. Still other event types may include external events, such as a trusted individual remotely connecting to the in-vehicle device to stream audio and/or video from the device or monitor other vehicle data. Other external events may be triggered by externally connected devices such as a Bluetooth button.

An event processing component 246 may trigger or perform actions for events that have occurred. The particular actions to perform may be configured by a user. For example, if a break-in event occurs, the action may comprise setting off an alarm, sending a notification to one or more communication points and to begin recording and stream data from the cameras. Further, if a tampering event occurs, the in-vehicle device may operate on an internal battery supply and send one or more notifications to one or more users, which may include captured images, video and/or audio captured from the cameras. For other events, such as detecting a gesture, other actions may occur. For example, if a thumbs up gesture is detected, the event processing may comprise capturing a still image from the camera, or capturing a short video from the forward facing camera and flagging the video to be transferred to a social network site for sharing. The capturing or flagging of the short video may flag the video for a configurable window of time on either side of the event. For example, if a hard braking event occurs, video may be flagged for storage a minute before and after the event occurred. Subsequent transfer of the video may occur when a suitable communication channel is available. The communication channel may be provided by a cellular connection of the in-vehicle monitoring device 102, if the use of cellular data is not a concern to the user, or the flagged videos may be transferred to a user's mobile device using, for example Wi-Fi or Bluetooth.

A device control component 248 may provide functionality for controlling operation of the in-vehicle monitoring device 102. The device control may include controlling an operating mode of the device, which may be selected from a plurality of different modes such as a low power mode, a full power mode, an emergency mode, a parked mode, etc. Further, the device control functionality may also provide control for how data is stored and or transferred. For example, the device may be configured to always transmit all data over a cellular connection, or may be configured to only transmit over the cellular connection if operating in the emergency mode. Data may be stored to an internal memory or removable memory, or may be only temporarily stored in volatile memory.

The components of the in-vehicle monitoring device 102 described above may be provided within a housing enclosure. The enclosure may provide an aesthetic enclosure that allows the device to be easily mounted within the vehicle. Different enclosures may be provided for different types of vehicles. For example a ruggedized enclosure may be provided for use in fleet vehicles where rough treatment may be expected. Additionally, while the above has described the use of OBD-II port connections, which are typically found on passenger vehicles, it is possible to use other types of connectors such as Deustch 9-pin connectors, which are commonly found in commercial vehicles.

Figure 3:
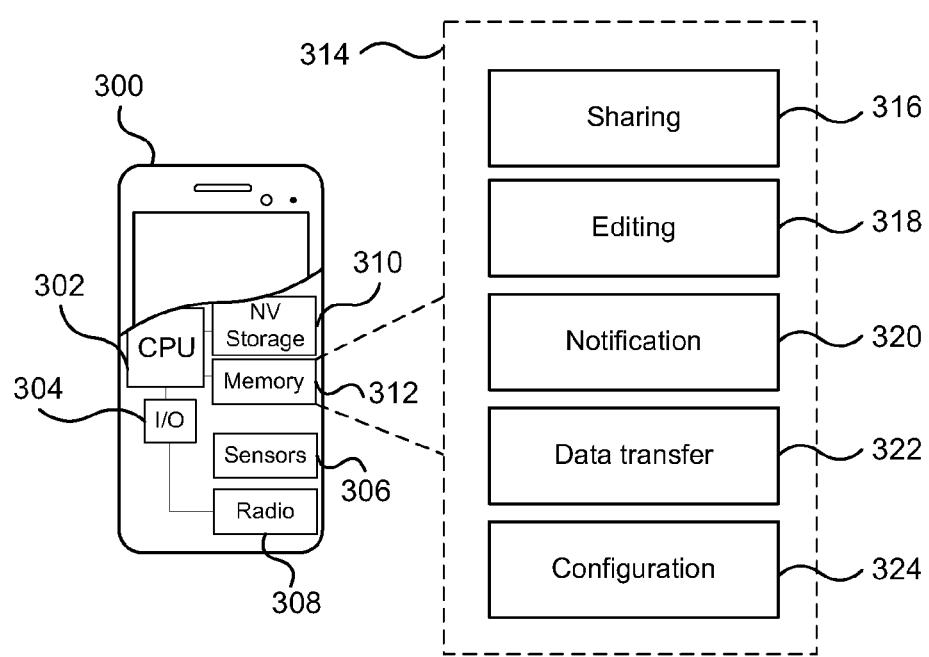
FIG. 3 depicts components of a mobile device for use with an in-vehicle monitoring device within an in-vehicle monitoring system.

FIG. 3 depicts components of a mobile device for use with an in-vehicle monitoring device within an in-vehicle monitoring system. The mobile device 300 may be used as the mobile device 108 as described above with reference to FIG. 1. The mobile device 300 may communicate with the in-vehicle monitoring device, either over a local communication radio, such as Bluetooth, or Wi-Fi, or over a cellular communication radio. The mobile device 300 may be used as a user interface for the in-vehicle monitoring device, as well as acting as a data mule to transfer data from the in-vehicle device to an external device over a remote network connection. The mobile device 300 may be able to connect to the in-vehicle monitoring device and stream data from the device such as video streams from the forward and/or rear camera. Further, the mobile device may receive and display vehicle data from the in-vehicle monitoring device. For example, the mobile device 300 may display information such as the vehicles speed, direction, location, etc. In addition to providing a user interface for the in-vehicle monitoring device, the mobile device may also receive data from the in-vehicle monitoring device, which may be edited and/or stored on the device or transferred to other computing devices such as social networks for sharing.

The mobile device 300 includes a processing unit 302 and an input/output (I/O) interface 304 for connecting other components to the processing unit 302. The I/O components may include one or more sensors 306 and one or more communication radios 308 such as Bluetooth radios, Wi-Fi radios, and cellular radios. The mobile device 300 may further comprise non-volatile (NV) storage 310 and memory 312 that stores data and instructions. The instructions stored in the memory 312, when executed by the processor 302, configure the mobile device 300 to provide vehicle monitoring functionality 314. Although the vehicle monitoring functionality may be implemented in various ways, the monitoring functionality 314 comprises a sharing component 316, an editing component 318, a notification component 320, a data transfer component 322 and a configuration component 324.

The sharing component 316 may provide functionality for sharing data, such as audio/video data and/or telematics data from the in-vehicle monitoring device with various online platforms. For example, the sharing functionality may allow for the uploading of videos or video clips, such as those flagged by the user performing a hand gesture, to social networks or data storage networks. The sharing component 316 may allow the sharing of data stored locally on the mobile device 300, or the sharing component 316 may connect to the in-vehicle monitoring device and cause the in-vehicle monitoring device to transfer data, such as videos, to a social network.

The editing component 318 may provide editing functionality for editing audio, video and/or pictures at the mobile device 300. The editing component 318 may edit content prior to transferring to other devices or network services. For example, the editing functionality may allow a user to perform basic editing operations including cropping, clipping, combining rotating, color correction, adding effects or filters, etc.

The notification component 320 may allow the mobile device to send and receive notifications. For example, the mobile device may receive a notification of a particular event occurring at the in-vehicle monitoring device and may display the notification to the user. Further, the mobile device may send a notification to the in-vehicle monitoring device that may be displayed at the in-vehicle monitoring device. The notifications may comprise data, text, audio and/or video information.

The data transfer component 322 allows the mobile device to transfer data to the mobile device from the in-vehicle monitoring device as well as to transfer data from the mobile device to other computing devices including network storage devices, personal computing devices, and social networks. Further, the data transfer component may allow real-time streaming of data such as audio, video and/or pictures from the in-vehicle monitoring device. The streaming data may be displayed and/or stored at the mobile device.

The configuration component 324 provides functionality for configuring and/or controlling the operation of the in-vehicle monitoring device as well as the monitoring functionality of the mobile device. The configuration may include, for example setting operating parameters, user preferences, user information, etc. for the devices. Further, the configuration and control may allow the mobile device to change the operating mode of the in-vehicle monitoring device.

Figure 4:
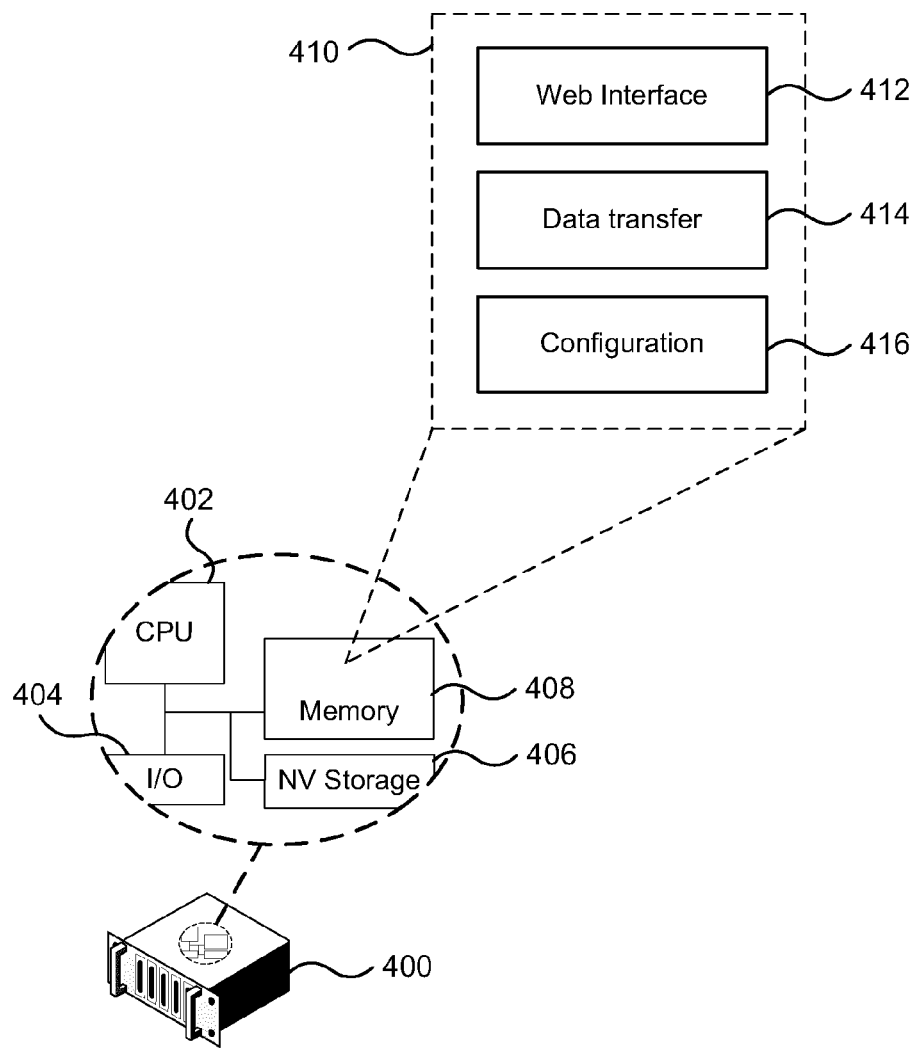
FIG. 4 depicts components of a remote server for use with an in-vehicle monitoring system.

FIG. 4 depicts components of a remote server for use with an in-vehicle monitoring system. The remote server 400 may be used as the web server 122 described above with regard to FIG. 1. The server 400 includes a processing unit 402 and an input/output (I/O) interface 404 for connecting other components to the processing unit 402. The I/O components may include one or more network interfaces for connecting the server to a network. The server 400 may further comprise non-volatile (NV) storage 406 and memory 408 that stores data and instructions. The instructions stored in the memory 408, when executed by the processor 402, configure the server 400 to provide monitoring server functionality 410. The monitoring server functionality 410 may include a web interface component 412, a data transfer component 414 and a configuration component 416. The data transfer component 414 and the configuration component 416 may provide similar functionality to the server as the data transfer component and the configuration component provides to the mobile device. The web interface component 412 allows users to access the data transfer functionality and configuration functionality of the server over the network, for example using a web browser on a computer or an application on a mobile device.

Figure 5:
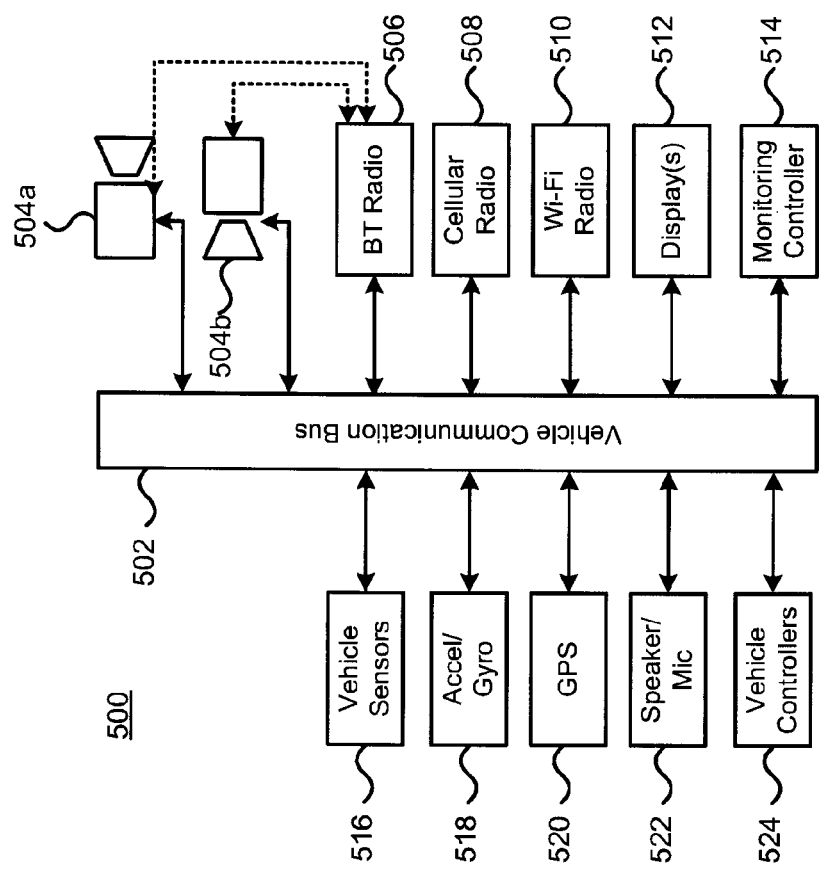
FIG. 5 depicts an alternative implementation of the in-vehicle monitoring device integrated within a vehicle.

FIG. 5 depicts an alternative implementation of the in-vehicle monitoring device integrated within a vehicle itself. The above has described the in-vehicle device as being a separate device capable of being connected to a vehicles OBD-II port however as depicted in FIG. 5 a vehicle system 500 can have the same functionality as described above, but the system may be implemented by components integrated within a vehicle's operating environment which can access the vehicle's communication bus 502 directly. A number of video cameras 504a, 504b may be provided and may communicate directly with the vehicle's communication bus 502 and/or through a Bluetooth™ radio 506 connected to the vehicle's bus. The cameras may for example be integrated with the rear-view mirror of the vehicle and/or utilize cameras positioned around the vehicle body. Other components connected to each other may include, for example, a cellular radio 508, a Wi-Fi radio 510, one or more displays 512, a monitoring controller 514 that provides monitoring functionality as described above, vehicle sensors 516, accelerometers/gyroscopes 518, a GPS 520, speakers and microphones 522 and various vehicle controllers 524. The components may communicate directly by the CAN bus, utilize in-vehicle infotainment system (IVIS) functions or be integrated in one or more subsystems or processors associated with the vehicle.

Figure 6:
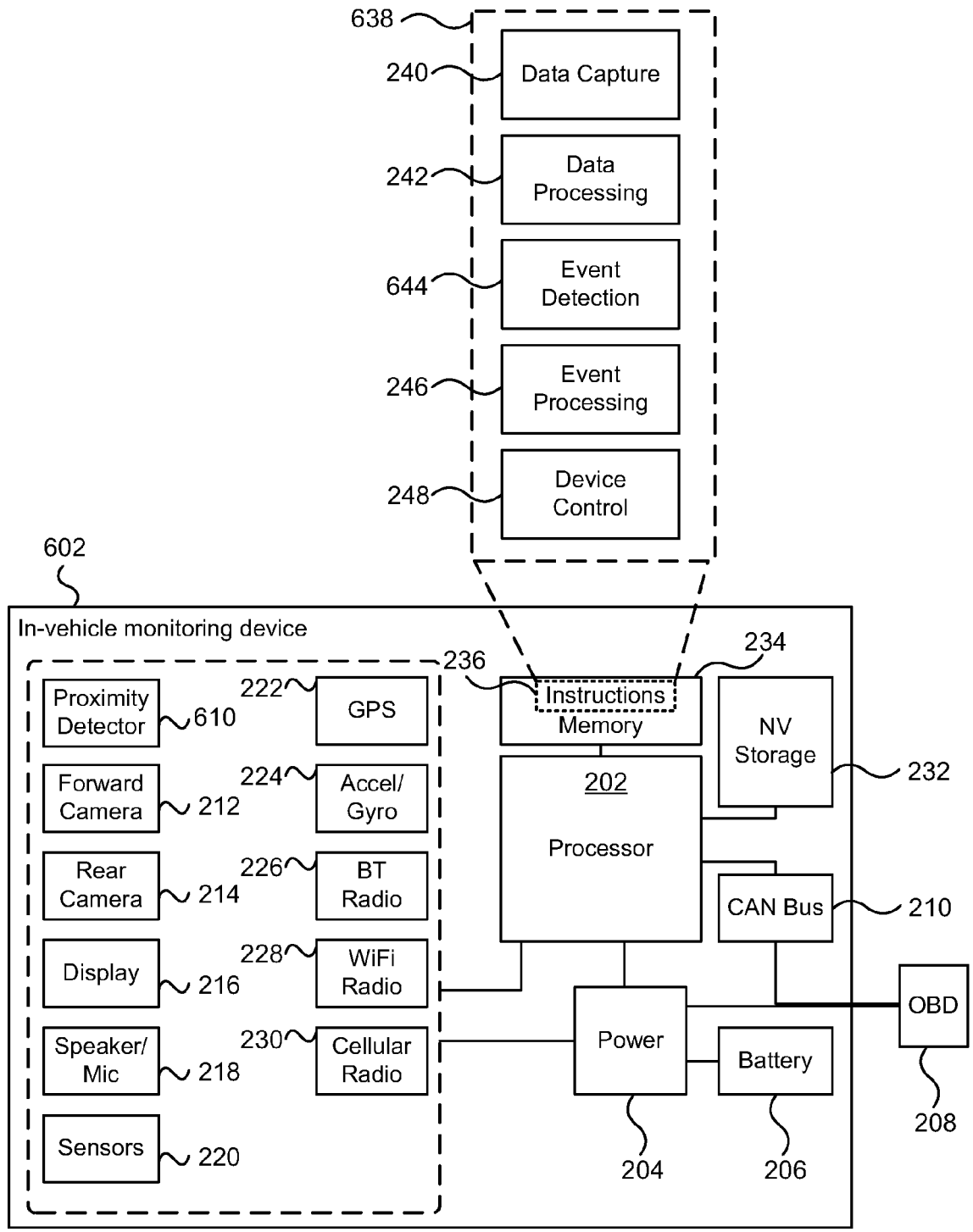
FIG. 6 depicts components of a further in-vehicle monitoring device.

FIG. 6 depicts components of a further in-vehicle monitoring device. The in-vehicle monitoring device 602 is similar to the in-vehicle monitoring device 202 described above and as such only differences between the devices will be described. The event detection functionality 644 of the in-vehicle monitoring device 602 uses a proximity detector 610 facing the interior of the vehicle in order to detect that an occupant may be attempting to perform a gesture. The proximity detector may be for example a time-of-flight ranging sensor such as a VL53L0X chip from ST, although other proximity sensors may be used. The proximity sensor may be a 1-dimensional sensor or may be a 2-dimensional sensor array. The detection of an object within the proximity range of the proximity detector 610 may be used as a detected gesture as described above. That is, the proximity detector may detect an object, such as an occupants hand, within a proximity range such as 30 cm (approximately 12 inches), and the detection of the object may be treated as a gesture. Accordingly, when an object is detected within the proximity range, an action associated with a gesture may be performed such as recording or flagging a portion of video captured from one or more of the cameras 212, 214. Alternatively, rather than using the object proximity detection as a gesture, the detection of the object within the proximity range may be used as an indication that an occupant is attempting to perform a gesture, which can trigger further image processing of the cabin image data captured from the rear camera 214. The triggered image processing may attempt to identify a particular gesture being performed. The particular gesture may be one of a plurality of predetermined gestures and may include, for example, thumbs-up/down gestures, swipe up/down/left/right gestures, a stop gesture as well as other possible gestures. The proximity sensor may be utilized to detect motion within the car interior when parked and generate a security alert if motion is detected.

The in-vehicle monitoring device and systems described above may be used to implement various functionality described above. The functionality may be implemented on the hardware by executing instructions stored in memory by the processor in order to configure the in-vehicle monitoring device to provide the desired functionality. Illustrative methods that may be implemented by the in-vehicle monitoring device and systems described above are depicted in FIGS. 7, 8A-8C, and 9.

Figure 7:
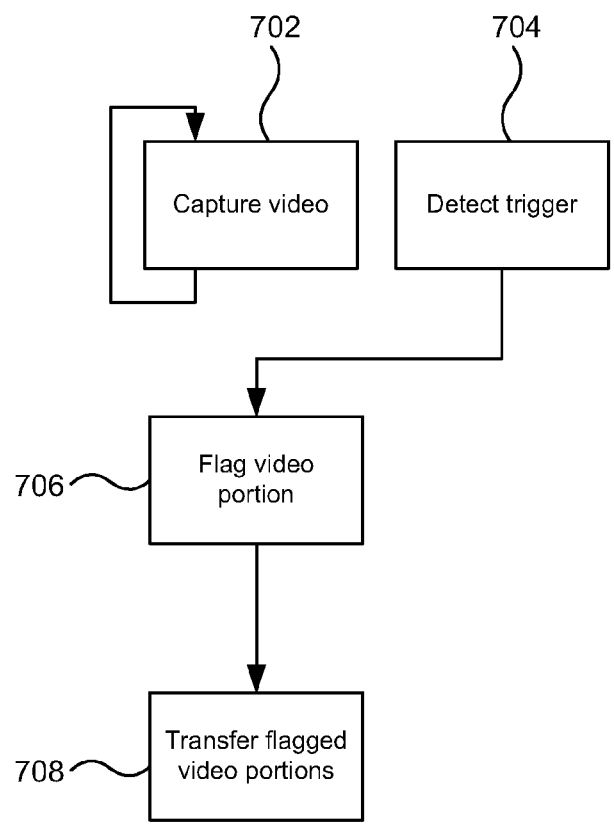
FIG. 7 depicts a method of monitoring a vehicle using an in-vehicle monitoring device.

FIG. 7 depicts a method of monitoring a vehicle using an in-vehicle monitoring device. The method 700 depicted in FIG. 7 captures video (702) from the external facing camera and possibly the cabin-facing camera. The video can be constantly recorded into a stream or into individual files of a particular length. For example, the video may be recorded into individual files each of 30 seconds, although shorter and longer segment lengths may be used. While the video is being captured, a trigger may be detected (704). The trigger may be a particular event that is associated with taking a particular action, which in the case of the method 700 depicted in FIG. 7 is to flag and transfer a portion of the captured video. The trigger may be based on detected gestures as well as based on voice recognition commands. Other trigger events are possible, including for example detecting unexpected events such as hard braking or a crash detection. As depicted, when a trigger is detected (704) a portion of the video portion is flagged (706). The video portion that is flagged may depend upon how the video is captured. For example, if the captured video is stored as a stream, the flagging may flagged a portion of the video stream a set period of time before the trigger occurred and for a set period of time after the trigger occurred. The portion of the video stream may be flagged by storing an indication of the start and end times of the portion in the stream or may copy the portion of the video stream to a separate file. Further, if the video is captured as individual files of a particular length, one or more of the individual files may be flagged to cover a time period before and after the occurrence of the trigger. After the video portion, or portions, have been flagged, the flagged video portion(s) may be transferred (708) from the in-vehicle monitoring device to a second computer system. The video transfer may be accomplished via a local connection with a mobile device, which may be referred to as data muling, or directly using a connection such as a cellular connection of the in-vehicle monitoring device. The in-vehicle monitoring device can also provide audio and visual cues when the device is being monitored remotely.

Figure 8A:
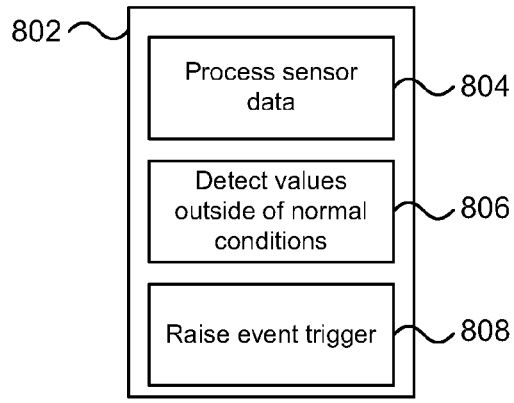
FIGS. 8A-8C depict methods of raising a trigger for use in monitoring a vehicle.
Figure 8B:
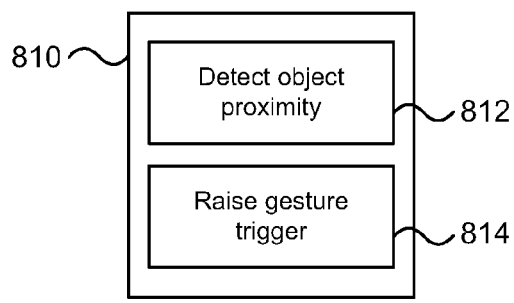
Figure 8C:
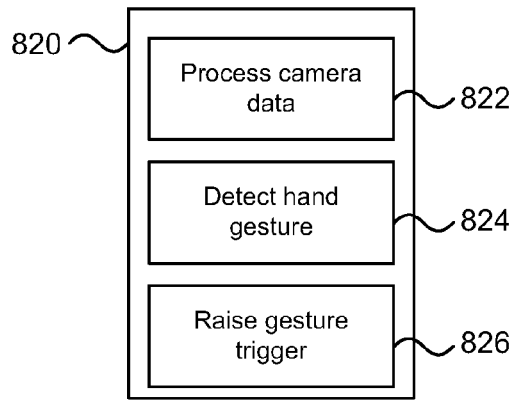

FIGS. 8A-8C depict methods of raising a trigger for use in monitoring a vehicle. The trigger raised by the methods depicted in FIGS. 8A-8C may be detected in the method 700 described above. Turning to FIG. 8A, the method 802 raises an event trigger based on sensor data. The sensor data is processed (804) and sensor values that fall outside of normal conditions are detected (806). Alternatively, the sensor data may be processed to determine if the sensor values meet other criteria. The sensor data that is processed may be from one or more sensors of the in-vehicle monitoring device such as accelerometers, gyroscopes, thermometers, etc. as well as vehicle sensors that may be accessed through the OBD-II port connection and the vehicle's network. The range of normal operating conditions or values may be predefined for example, a normal condition for the temperature may be between −25 C to +55° C. The normal operating condition may be specified for an amount of braking force in order to raise a hard braking trigger if braking forces greater than the limit are experienced. The normal conditions for the sensors may be dependent upon one or more factors, for example, the braking force threshold may be dependent upon a driver of the vehicle. When the sensor values are detected outside of the normal conditions, an event trigger is raised (808). The event trigger that is raised may depend upon the particular sensor values that were detected. The raised event trigger may be detected and used for flagging video as described above. In addition to flagging the video, additional data such as the sensors values detected that caused the trigger may also be stored in association with the flagged video.

Turning to FIG. 8B, the method 810 raises a gesture trigger using a proximity detector. As described with reference to FIG. 6, the in-vehicle monitoring device may include a proximity detector. The proximity detector may detect an object within a proximity range of the detector (812). Although the proximity detector may not be able to distinguish between objects, the detected object could be an occupant's hand. The detection of the object may be considered as a gesture, and so a gesture trigger may be raised (814) when an object is detected in close proximity. The gesture trigger may again result in flagging of video and then transferring the flagged video.

Turning to FIG. 8C, the method 820 raises a gesture trigger using image data captured from a cabin-facing camera. The method 820 processes the camera data (822) to detect a hand gesture (824) in one or more images of the camera data. The processing may use known image processing techniques to detect one or more particular gestures. Although not depicted in FIG. 8C, the processing of the image data may be initiated upon detecting an object by the proximity detector. If a hand gesture is detected in the camera data a gesture trigger is raised (826). The particular gesture trigger that is raised may depend upon the hand gesture detected in the camera data.

Figure 9:
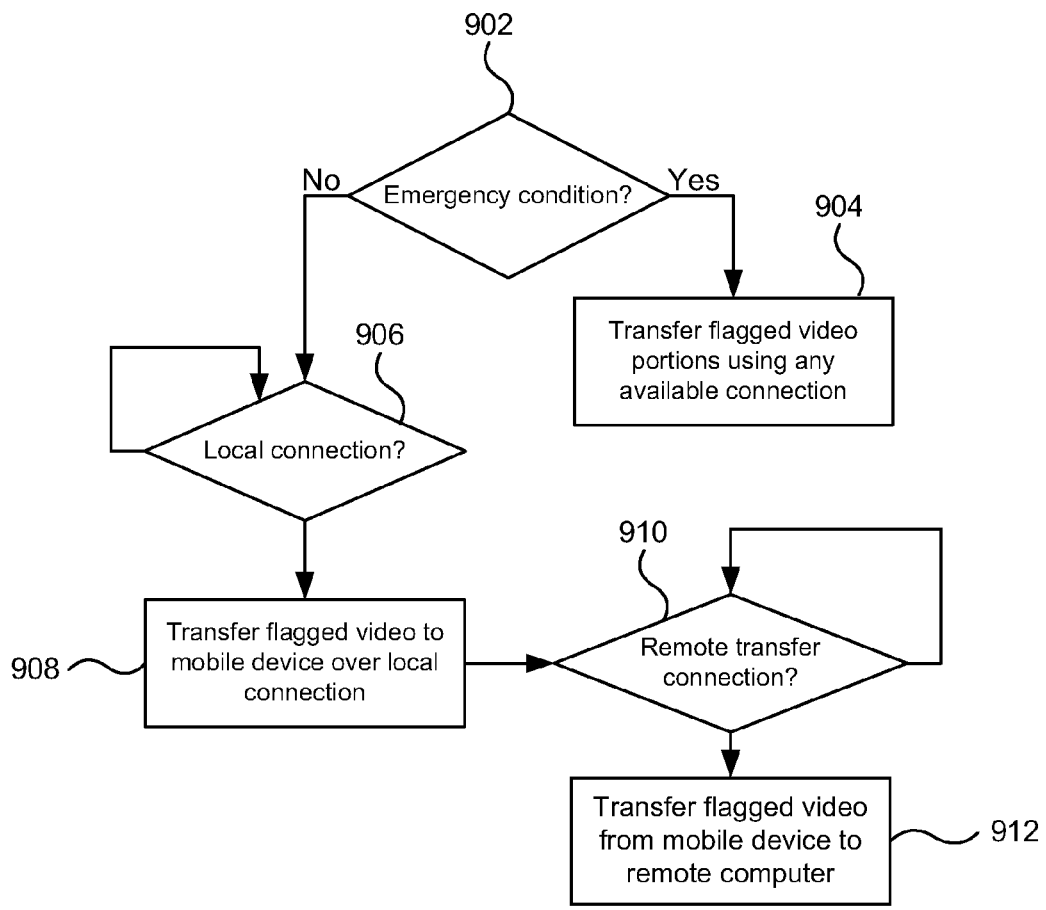
FIG. 9 depicts a method of transferring a flagged video from an in-vehicle monitoring device.

FIG. 9 depicts a method of transferring a flagged video from an in-vehicle monitoring device. The method 900 determines if there is an emergency condition (902). An emergency condition may occur under various conditions. For example, if there was rapid deceleration indicative of a possible accident, the in-vehicle monitoring device may enter an emergency condition. Further, the emergency condition may be determined from vehicle information accessible over the OBD-II port. If it is determined that there is an emergency condition (Yes at 902) the in-vehicle monitoring device may transfer the flagged video portions using any available connection (904). For example, the in-vehicle monitoring device may use a cellular connection in an emergency regardless of an associated cost for transferring video over a cellular connection. In addition to transferring the video, the in-vehicle monitoring device may also send one or more notification messages to particular locations. If there is no emergency condition (No at 902), the method 900 determines if there is local connection (906) between the in-vehicle monitoring device and a mobile device of a user. The local connection may be for example a Bluetooth connection with the user's mobile device, or Wi-Fi connection with a user's mobile device. If there is no local connection available (No at 906), the method continues to wait until there is a local connection available. When a local connection is available (Yes at 906) the in-vehicle monitoring device transfers the flagged video to the mobile device over the local connection (908). Once the flagged videos have been transferred to the mobile device, the mobile device may transfer the videos to one or more other computer devices, including for example to one or more social networks. When transferring the videos from the mobile device, the mobile device may determine if there is remote transfer connection available (910). The remote transfer connection may be for example the user's home Wi-Fi network, a wireless hotspot, or a cellular connection. What is considered a remote transfer connection may be specified by the user. For example, a user may not wish to transfer personal information over public hotspots or may not wish to transmit the large amounts of data for videos over a cellular connection. Further, the remote transfer connection may be a wired connection, such as connecting the user's mobile device to a computer by a USB cord or similar connection. If there is no remote transfer connection available (No at 910), the method 900 may continue to wait to transfer the videos until a remote transfer connection is available. If a remote transfer connection is available (Yes at 910), the flagged videos are transferred from the mobile device to the remote computer system (912). Although described as transferring flagged videos, it will be appreciated that additional and or alternative information may be transferred from the in-vehicle monitoring device to the remote computing system.

The above has described an in-vehicle monitoring device and system along with possible operations. Various usage scenarios are detailed further in the following tables.

Possible operational scenarios of the in-vehicle device are detailed in the following table.

TABLE 1

| Use cases of the in-vehicle device | | | |
|---|---|---|---|
| Operation | Sub classes | Use | Functions |
| Power | Source power | OBD-II port/ Deutsch 9-pin port | Main power source for in-vehicle device. Port provides direct power for the in-vehicle device, the source is always on regardless if the engine is powered up or not (provided that the car battery has sufficient voltage). |
| | Battery backup | Do not kill the car battery | It is necessary to be careful not to drain the car battery while the vehicle is parked for prolonged periods. In-vehicle device should move into low power mode once the engine is switched off, only to awake when a sensor detects an abnormal situation. When in-vehicle device is connected, the user may request snaps from in-vehicle device's cameras from time to time. If the car battery voltage is too low software should notify the cloud that no further requests can be met. In-vehicle device needs to be notified that it needs to switch into low power mode and remain that way until told otherwise. |
| Security | Car security | Car parked | This use case relates to the situation where the driver has left the car (in-vehicle device is no longer paired with the driver's smart device). In-vehicle device will actively monitor the car for disturbances - noise or movement related. If something occurs in-vehicle device will immediately broadcast a notification to the smart devices registered to in-vehicle device. The notification process will be smart enough to avoid nuisance notifications. In-vehicle device/Cloud no longer reachable notification should also be provided. Dependent on data plan preview snaps from both cameras or access to live video stream from either camera will be available in the mobile app. |
| | Device security | Anti-tamper notification | Detection of device tampering for detecting if any person, including driver, tampers with the device. An alert can be generated and sent along with media from the cameras, telematics and GPS. |

TABLE 1-continued

Use cases of the in-vehicle device

| Operation | Sub classes | Use | Functions |
|---|---|---|---|
| Dashcam + CAN Bus data | Driving | Recording journey | The main use case for the dashcam is the recording the journey. Journey recording begins once the engine is started, and completed once the engine turns off - a journey can include different legs of the journey between vehicle starting and stopping (i.e. getting gas, lunch etc.) Rear camera may also recorded |
| | | Telematics | Telematics overlay for the recorded video, such as time of day, outside temp, speed, braking. Plus anything else that could be useful for replay purposes and accident support. |
| | | Automated tagging | Upon an events such as hard braking or sharp swerving, the video is tagged |
| | | Event gesture | In-vehicle device via its rear camera provides the ability to recognize a gesture - for tagging the dashcam recording for accidents, events, bad driving etc. A short video user definable between 1-2 mins (for example one minute prior to the gesture and one minute after the gesture) in duration is tagged - for download to social media or other locations. Note 20 secs before the gesture is detected may be the start point of the video. Audible feedback of a gesture being caught by in-vehicle device may be provided. |
| | | Remote viewing | The ability for a spouse or parent or fleet manager, or other trusted individual to view via their mobile device a snap from the dash cam. This snap will be transmitted to the cloud via the driver's smart device cell connection<br>The thought behind this use case - an individual's wife or husband is driving and the individual wants to check the state of the road without disturbing the driver - enter into the app and request a snap view from the dashcam. |
| | | Time Lapse mode | The user will be provided the ability to rapidly, visually step through a recorded journey video. After the journey has completed via the app |
| | Parked | Car is moved | The dashcam's role once the vehicle is parked is to provide support to the security system provided by the device. Snap view will be available upon user demand or as part of detection notification. i.e. software detects an abnormal situation and sends a notification to the user along with a snap of the dash and the rear facing cam. |

TABLE 1-continued

Use cases of the in-vehicle device

| Operation | Sub classes | Use | Functions |
|---|---|---|---|
| | | Glass Break/Loud Sound Detected | In-vehicle device will capture an image whenever the sound of glass breaking or car alarm is detected and send it up to the cloud. This could be a potential smash and grab scenario. This will be through the cellular connection. |
| | | Air pressure change | Capture an image when there is a significant change in air pressure (door opened/window broken). |
| | | Time Lapse mode | The user may be provided the ability to rapidly, visually step through the time spent parked. |
| OBD/Telematics data | Driving | Displayed on mobile device | Driving support information presented on user's mobile device. Driving support information allows for spouse/partner to monitor the driver |
| | | Recorded in Cloud | OBD-II and telematics may be recorded to cloud storage, including for example. (in App) Car track of route, displayable on map, speed, hard braking points, time taken, average speed, any stops made. |
| | Parked | Notifications | Notifications related to important issues like very low fuel levels, service now due, diagnostic trouble codes, low battery etc. |
| | | App dashboard | User is able to review car status information via mobile app dashboard. Car status, fuel, any relevant service faults, security system status, next service estimate, fuel level, plus anything else important. |
| Cameras(front and rear) | Parked | Security camera mode | The rear facing camera will provide support for the devices software security system while the car is parked. Snap view will be available upon user demand or as part of software's detection notification. i.e. software detects an abnormal situation and sends a notification to the user along with a snap of the dash and the rear facing cam. |
| | Parked Parked | Glass Break/Loud Sound Detected | In-vehicle device will capture an image whenever the sound of glass breaking is detected and send it up to the cloud. This could be a potential smash and grab scenario. This will be through the cellular connection. |
| | | Air pressure change | Capture an image when there is a significant change in air pressure (door opened/window broken). |
| | | Time Lapse mode | The user will be provided the ability to rapidly, visually step through the time spent parked. |

TABLE 1-continued

Use cases of the in-vehicle device

| Operation | Sub classes | Use | Functions |
| --- | --- | --- | --- |
| | | Security camera mode | The rear facing camera will provide support for the devices software security system while the car is parked. Snap view will be available upon user demand or as part of software's detection notification. i.e. software detects an abnormal situation and sends a notification to the user along with a snap of the dash and the rear facing cam. |
| | Parked | Glass Break/Loud Sound Detected | In-vehicle device will capture an image whenever the sound of glass breaking is detected and send it up to the cloud. This could be a potential smash and grab scenario. This will be through the cellular connection. |
| | | Air pressure change | Capture an image when there is a significant change in air pressure (door opened/window broken). |
| Wireless connection scenarios | Bluetooth (BLE) Wi-Fi | Time Lapse mode | The user will be provided the ability to rapidly, visually step through the time spent parked. |
| | | Smart device | Ability to automatically connect (once setup) a smart devices via Wi-Fi for video data sharing benefits. |
| | Wi-Fi Cellular | recognized Wi-Fi | Automatically connect to home Wi-Fi network once in range. Smart management of this radio will be provided to ensure the user can transfer video files etc. when parked at home. |
| | | Releasing a Wi-Fi connection | The connection is dropped after a reasonable time-out period. (power consumption management) |
| | | Always available | Always on connection to the internet via cellular. Data usage is managed so that in-vehicle device is able operate effectively with the lowest cost plans. |
| | Installation | New installation | Installation to be guided by the smartphone App, including OBD-II port position info for the car. Guided setup is provided to ensure user is successful and has good information about the general capabilities of the product. Initial connection will be via BLE (assumed to be the easiest scheme to set the product from). In-vehicle device camera positioning will be validated via in-vehicle device display in real time. (move in-vehicle device around until the right location is found) |
| | | Geo-fencing | Geo-fencing technology between the in-vehicle device and users' mobile devices to automatically arm and disarm the security features of the in-vehicle device |

TABLE 1-continued

Use cases of the in-vehicle device

| Operation | Sub classes | Use | Functions |
|---|---|---|---|
| Battery | Security | | In the event of an accident where the power connection is lost, in-vehicle device can maintain all video such that if the user then takes out the SD Card they are able to play all files. (There needs to be enough battery to notify the trusted circle of the accident with snapshot and anything else required) |
| | | | In the event your battery is too low, in-vehicle device can wake up at a set interval to send a heartbeat with GPS location |
| | | | In the unlikely event that the voltage drops below 6V for a short duration, like when the car starts, continue running off internal battery without rebooting. |
| | | | When unplugged from the car, in-vehicle device notifies the user with a snapshot and GPS location before shutting down. |

The following table details possible uses of the mobile device's monitoring app.

TABLE 2

Table of possible uses of the mobile device's monitoring app

| Operation | Sub classes | Use | Functions |
|---|---|---|---|
| Initial setup | | Hardware/app first contact | Establish BLE link between phone and in-vehicle device, to setup the Wi-Fi connection automatically to home and in-vehicle device (if available) |
| | | | Establish BLE link between phone and in-vehicle device, to setup the Wi-Fi connection automatically as possible to in-vehicle device. Note: make sure LTE internet streaming capability is default on whenever user phone is connected Wi-Fi to in-vehicle device |
| | | Multiple users | Support multiple users i.e. couple and kids (cell phones) from a single account. |
| | | Multiple vehicles | Ability to add and switch between vehicles (accounts) easily. |
| Car dashboard | Car status | OBD parameters | Provide a subset of gauges showing car status - such as speed, fuel, maintenance due in . . . , any meaningful faults etc. |
| | | Car view | Most recent preview from both cameras is shown within the dashboard. If the user selects a preview they can see a full size version (snapshot) on their screens. The user will have the ability to refresh the snaps. |
| | | Map view | In this view the user can see the current location of the car on a map, or if it is on the move the current location and the track of the current journey. Map Zoom control should be provided |

TABLE 2-continued

Table of possible uses of the mobile device's monitoring app

| Operation | Sub classes | Use | Functions |
|---|---|---|---|
| | | Active alerts | Within the dashboard, show the most recent event generated by App rule engine. If there is associated media such as snaps etc. make the event clickable for more information. |
| | | Alert list | Provide a clickable icon that allows the user to see a sorted list of events. Clicking on a notification will give the user more information on the events |
| | in-vehicle device | Health | In-vehicle device health monitor - green it is healthy, red relates to operation issue and what the issue is. |
| Dash Cam media access | Access to recorded Dash Cam video | View event created video/audio (shorts) | Event created videos are shorts (1-2 min) of the either an automatically created video, created by hard braking, swerving etc. or via Gesture or by selecting from time lapse video |
| | | View time Lapse recording | The user is able to view a time lapse of stored previous journeys and from a time lapse select point, download a short to their phone for viewing. |
| | | Cloud storage | In general video shorts are stored in our cloud and can be downloaded for display on the phone or via a web browser |
| | Access to recorded rear facing cam video | View event created video/audio | In sync with dashcam shorts, the user will also be able to view rear camera recorded video. Would be desirable to view both on the screen at the same time (picture in picture/ or side by side ) |
| | Map support | Car track perspective | Along with support to view video shorts, map track information will be presented, correlated to the video GPS data. Also automated tagged events as well as event gesture events will be shown on the map display when/where they occurred on the journey. |
| | Media storage card failure | Detection | If the media storage card in in-vehicle device fails, the app is informed and is able to present the user with a message explaining the problem and the proposed solution. (bad sectors, too slow IO, can't read, format issue, encryption key incorrect, etc.) |
| Rules | Security rules | Trigger rules | Define the rules when the user is notified about a security event. Choices should include car movement, loud sound, door opening (if OBD supports) and motion detected. |
| | | Arming security | Geo-fencing auto arming/dis-arming. |
| | Notify only rules | Being informed | Being informed about certain events - pick from list. |
| | Accident/Incident rules | Tagging rules | Define the rules of when Video tagging should occur. Choices should include hard braking, detected swerve, sudden stop, loud noise |
| | Gesture | gesture action | Define action to take based on gesture |
| Alerts | Content | | The alert can be descriptive so that users can clearly understand the intent of the message. Where possible (and when it makes sense) associated media and telematics should be attached (to help provide context). |

TABLE 2-continued

Table of possible uses of the mobile device's monitoring app

| Operation | Sub classes | Use | Functions |
|---|---|---|---|
| | Notification delivery | Mobile notifications | Select to receive alerts via mobile notifications |
| | | Text message | Select to receive alerts via a Text message (and possibly snaps from cameras and/or shortened URL to page with more information: maps/telematics/snaps/video) |
| | | Email | Select to receive alerts via an email (may not be used much) |
| Car off the road | Service appointment/lending car out | Product mute notifications | Provide the ability for the user to mute notifications (similar to telegram). Mute for a time period: 1 hr, 4 hrs, 2 days, etc. and/or until phone is paired |
| | Long term parking (1 to 4 weeks) | Trickle mode | In this mode in-vehicle device goes into a hibernation mode and wake up for short scheduled periods to check on the security of the car. In this mode the system may miss a break in attempt, but it will provide peace of mind to the owner that with the last report was that the car is ok. This would require auto-notifications with snaps sent to the cloud/app. |

The following table details possible events that may be detected or generated at the in-vehicle monitoring device

TABLE 3

Table of possible events

| | |
|---|---|
| Engine start/stop | Speeding |
| Low fuel | Being towed |
| Low oil | Loud noise |
| Low wiper fluid | Pressure change (Door Opened) |
| Mechanical alert (fault code) | Panic Button Pressed |
| Battery drops below threshold voltage | Accident just occurred while driving |
| Service due | Car parked and bumped |
| High oil temp | Air bag deployed |
| Low brake fluid | Weather warning for your location |
| Low tire pressure (where applicable) | Ice risk |
| Excess RPM (near redline) | Outside temperature for your location |
| Throttle position (excessive acceleration request) | Car altitude |
| Distance traveled with check engine light (MIL) on/distance traveled with MIL off (used to calculate mileage) | Temperature below threshold |
| Fuel Tank level (if available) | Temperature above threshold |
| Vehicle VIN | Chip unplugged |
| Outside temperate (as observed by car) | Loss of cellular connection |
| Hard acceleration | Connected to cellular network (internal SIM) |
| Hard braking | Connected to home WIFI |
| Rapid manoeuvre (swerve) | Event of note (event button pressed) |
| Trip underway | Proximity alert (partner/kid entered car) |
| Parked | Connected to mobile device |
| Parked at home | Connected to public hotspot |

The following table details possible driving analysis usages.

TABLE 4

Table of possible driving analysis usages

| Operation | Sub-Class | Use | Function |
|---|---|---|---|
| Driving | Navigation | Route guidance | Next turn type instruction - the display provides the most helpful information to the driver - given the limitation of the small screen |
| | | ETA | Estimated time of arrival of the journey |
| | Protect me from a speeding ticket | Overspeed indicator | Device display shows the speed above the posted speed limit. For example speed limit is 40 mph and the car is at 47 mph, the overspeed indicator will display "7". If the car is travelling at the speed limit it will display "0" and below it will display blank. |
| | | Speed limit just changed | New speed limit appears, along with an optional audible warning |

TABLE 4-continued

Table of possible driving analysis usages

| Operation | Sub-Class | Use | Function |
|---|---|---|---|
| | Green | Fuel economy readout | Readout display's either mpg or liters per 100 km. Or something more creative by using both displays. |
| | Weather | Outside temperature | Display a warning when road icing conditions could occur |
| | Engine on/off | Display device and/or vehicle status | device health and wireless connection status |
| Post journey review | Summary Report of the journey | Distance traveled, time taken | Distance travelled by the vehicle for the current journey |
| | | Average speed, fuel used, highest speed | |
| | | Fuel used, avg. fuel economy | |
| | | Hard braking points, speeding | |
| | Trophies | Safe driving | Driving within 5 km of speed limit, no hard braking points, lateral forces kept below threshold, acceleration moderate (no flooring the throttle) |
| | | Green driving | Average fuel economy - in top 20% of all journeys . . . |

The following table details possible data transfer usages.

TABLE 5

Table of possible data transfer usages

| Operation | Subcase | User Location | Connectivity | Function |
|---|---|---|---|---|
| Capture image of an incident of interest detected | Car parked (or towed), engine off | Remote | Wi-Fi (via home Wi-Fi) | Automatic upload to cloud, telematics, snapshots and shorts. Add option in App for automatic upload |
| | | | Cellular | Telematics, Snapshots, and/or Shorts. Add option in App for automatic upload |
| | Engine is on | Remote | Wi-Fi (Car Access Point) | Automatic upload to cloud, telematics, snapshots and shorts. Add option in App for automatic upload |
| | | | Cellular | Automatic upload to cloud, telematics, snapshots and shorts. Add option in App for automatic upload |
| Sharable after incident | Need Evidence Immediately | In Car | — | Plug in USB stick into in-vehicle device. Use App to control copy |
| | | | Bluetooth | Copy to phone and email Short. Share via file service |
| | Post Accident | Remote | Cellular | Mark the Short to not be deleted. Send to cloud |
| | Car battery is dead or unable to power in-vehicle device | — | — | Remove the SD card (if it exists) (encryption may be provided). And plug it into the computer. Power in-vehicle device via USB. USB drive needs to be enabled by the app. |

TABLE 5-continued

Table of possible data transfer usages

| Operation | Subcase | User Location | Connectivity | Function |
|---|---|---|---|---|
| Share Short on Social Media (user already gestured and short exists) | Shared directly from App, Short not on Phone | Remote<br>Remote<br><br>Remote<br>In Car | Wi-Fi<br>Tethered/Data Muling<br>Cellular<br>Bluetooth Connected | |
| | Shared directly from App, Short on Phone | — | — | Posted to Social Media Immediately |
| Capture an interesting event Use the App to review previous video to find the cool event and mark a Short | | Remote | Wi-Fi | Mark the short on in-vehicle device to not delete it. Copy to cloud immediately |
| | | | Tethered/Data Muling | Mark the short on in-vehicle device to not delete it. Copy to cloud immediately |
| | | | Cellular | Mark the short on in-vehicle device to not delete it. Download when better connectivity available |
| | | In Car | Bluetooth Connected | Mark the short on in-vehicle device to not delete it. Copy to cloud immediately |
| Save trip information for posterity | Reviewing complete trip | Remote<br><br><br>In Car | Wi-Fi<br>Tethered/Data Muling<br>Cellular<br>Bluetooth Connected | |
| Parent catching bad driving | Notice for hard braking, erratic driving | Remote | Tethered/Data Muling | Data copied to cloud and Parent's phone via Data Muling. |
| | | | Cellular | Parent marks data to not be deleted. Data can't be deleted until copied to Parent's phone |
| | Capturing a Short | Remote | Tethered/Data Muling | Data copied to cloud and Parent's phone via Data Muling. |
| | | | Cellular | Parent marks data to not be deleted. Data can't be deleted until copied to Parent's phone |

Data from multiple in-vehicle monitoring devices 102 can be aggregated at server 122 or a cloud based service as shown in FIG. 1. The data collected can be aggregated and analyzed to provide additional analytics associated with infrastructure and vehicle performance either individually or collectively. A subset of the data collected can be provided in real-time or near real-time through mobile network interface with additional data being provided when a home network is available for upload dependent on the data network configuration of the device. Alternatively the data may be uploaded at specific intervals when identified by a user, for example the user may authorize upload of data when a traffic incident is identified or may occur automatically at a location where an incident has been previously reported to provide real-time updates. Image data may be uploaded in real-time, however it may be dependent on event identification or telematics information. For example observation of a traffic incident or infrastructure issue may be uploaded when flagged by the user to be explicitly identified and shared either to specific friends or be available to the network. The aggregated data can be processed and presented to define scenarios such as but not limited to: Where and when are people driving? Where and when are they speeding? Where are hard braking (potential, near accidents) occurring? What does the road conditions look like right now? Where are the major potholes? The data can be provided in a web application, a mapping application, social networking application, messaging alerts, etc. or delivered and displayed on in-vehicle monitoring devices 102 or in-vehicle systems. The aggregated data may also be utilized to identify trends which occur over longer periods of time in regards to infrastructure performance and usage.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more components or modules to perform the steps corresponding to one or more methods, for example, has generation, transmitting, processing, and/or receiving steps. Thus, in some embodiments various features are implemented using components or modules. Such components or modules may be implemented using software, hardware or a combination of software and hardware. In some embodiments each component or module is implemented as an individual circuit with the device or system including a separate circuit for implementing the function corresponding to each described component or module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Various features in the present application relate to a technical problem of how to capture, process and share vehicle data and images and provide the ability to share and process data.

Numerous additional variations on the methods and apparatus of the various embodiments described above will be apparent to those skilled in the art in view of the above description. Such variations are to be considered within the scope.

What is claimed is:

1. An in-vehicle monitoring device for use within a cabin of a vehicle comprising:
a front camera arranged to capture an exterior view from the cabin of the vehicle;
a rear camera arranged to capture an interior view of the cabin of the vehicle;
a display capable of displaying information to an occupant of the vehicle;
a wireless communication interface coupled to a wireless network connection;
a power and communication interface coupled to an on-board diagnostic (OBD) type II or a Deutsch 9 port connector for coupling the in-vehicle monitoring device to a vehicle's telematics network and for powering the in-vehicle monitoring device;
a memory for storing data and instructions;
a processor operably coupled to the front camera, rear camera, display, and the memory, the processor capable of executing the instructions stored in the memory, which when executed configure the in-vehicle monitoring device to:
detect a triggering event performed within the cabin of the vehicle; and
based upon detection of the triggering event, storing in the memory, recoded video of one or more of:
at least a portion of exterior image data captured from the front camera; and
at least a portion of interior image data captured from the rear camera;
flag a portion of the recorded video in the memory of the in-vehicle monitoring device;
associate vehicle data received from the power and communication interface with the portion of the recorded video that was flagged;
transfer the portion of the recorded video that was flagged from the in-vehicle monitoring device to a second device through the wireless network connection;
detect a disconnection of the port connector;
switch to an internal rechargeable battery; and
perform an anti-tampering action.

2. The in-vehicle monitoring device of claim 1, wherein detecting the triggering event comprises detecting a gesture in the interior view of the cabin of the vehicle.

3. The in-vehicle monitoring device of claim 2, further comprising a proximity detector arranged to detect proximity of an object within the cabin of the vehicle, wherein detecting the gesture comprises: detecting as the gesture an object within a proximity range of the proximity detector.

4. The in-vehicle monitoring device of claim 2, wherein detecting the gesture comprises processing interior image data captured from the rear camera to detect at least one feature in the interior image data as the gesture.

5. The in-vehicle monitoring device of claim 4, further comprising a proximity detector arranged to detect proximity of an object within the cabin of the vehicle, wherein detecting the gesture comprises:

detecting an object within a proximity range of the proximity detector; and upon detecting the object within the proximity range, processing the interior image data to detect the at least one feature in the interior image data as the gesture.

6. The in-vehicle monitoring device of claim 5, wherein the at least one detected feature comprises a plurality of features detected in one or more frames of the interior image data, the plurality of features used in determining performance of the gesture from a plurality of known gestures.

7. The in-vehicle monitoring device of claim 6, wherein the plurality of known gestures comprises a plurality of:
a thumbs-up gesture;
a thumbs-down gesture;
a swipe gesture; and
a stop gesture.

8. The in-vehicle monitoring device of claim 6, wherein each gesture of the plurality of known gestures is associated with performing a respective action of a plurality of possible actions including storing at least the portion of the interior image data or the portion of exterior image data.

9. The in-vehicle monitoring device of claim 1, further comprising a microphone, wherein detecting the triggering event comprises detecting one or more known utterances from microphone data, the one or more known utterances each associated with a respective action of a plurality of possible actions including storing at least the portion of the interior image data or the portion of exterior image data.

10. The in-vehicle monitoring device of claim 1, wherein the instructions, when executed by the processor, further configure the in-vehicle monitoring device to:
access vehicle telematics data over the port connector; and
display at least a portion of the vehicle telematics data on the display of the in-vehicle monitoring device.

11. The in-vehicle monitoring device of claim 1, wherein the anti-tampering action comprises one or more of:
capture an image from the front camera;
capture an image from the rear camera;
capture a video from the front camera;
capture a video from the rear camera;
transmit one or more images to a remote location;
transmit one or more captured videos to the remote location;
transmit vehicle informatics to the remote location; and
send a notification.

12. The in-vehicle monitoring device of claim 1, further comprising:
a short range communication radio; and
a cellular communication radio.

13. The in-vehicle monitoring device of claim 12, wherein the short range communication radio comprises one or more of:
a Wi-Fi radio; and
a Bluetooth radio.

14. The in-vehicle monitoring device of claim 13, wherein the instructions, when executed by the processor, further configure the in-vehicle monitoring device to determine a driver from one or more known drivers associated with the in-vehicle monitoring device based on Bluetooth pairing to a mobile device.

15. The in-vehicle monitoring device of claim 1, wherein the in-vehicle monitoring device is configured to transfer data to a mobile device over a communication channel established using a short range communication radio.

16. The in-vehicle monitoring device of claim 1, wherein the instructions, when executed by the processor, further configure the in-vehicle monitoring device to:
detect an immediate transfer condition; and
transfer stored data from the in-vehicle monitoring device to an external device using a cellular communication device.

17. The in-vehicle monitoring device of claim 1, wherein the instructions, when executed by the processor, further configure the in-vehicle monitoring device to:
receive a streaming request from a remote device; and
stream to the remote device video from the front camera or from the rear camera.

18. The in-vehicle monitoring device of claim 17, wherein the instructions, when executed by the processor, further configure the in-vehicle monitoring device to:
provide an auditory or visual indication of the streaming request prior to streaming to a remote device.

* * * * *

UNITED STATES PATENT AND TRADEMARK OFFICE
CERTIFICATE OF CORRECTION

| | | |
|---|---|---|
| PATENT NO. | : 11,436,844 B2 | Page 1 of 1 |
| APPLICATION NO. | : 16/608718 | |
| DATED | : September 6, 2022 | |
| INVENTOR(S) | : Dan Carruthers et al. | |

It is certified that error appears in the above-identified patent and that said Letters Patent is hereby corrected as shown below:

In the Claims

In Claim 1, Column 36, Lines 34-35:
"based upon detection of the triggering event, storing in the memory, recoded video of one or more of:"

Should read:
-- based upon detection of the triggering event, storing in the memory, recorded video of one or more of: --

Signed and Sealed this
Eighteenth Day of October, 2022

Katherine Kelly Vidal
*Director of the United States Patent and Trademark Office*